US007206807B2

(12) United States Patent
Cheenath

(10) Patent No.: US 7,206,807 B2
(45) Date of Patent: Apr. 17, 2007

(54) ASYNCHRONOUS INVOKING A REMOTE WEB SERVICE ON A SERVER BY A CLIENT WHO PASSES ON A RECEIVED INVOKE REQUEST FROM APPLICATION CODE RESIDING ON THE CLIENT

(75) Inventor: Manoj Cheenath, Alameda, CA (US)

(73) Assignee: BEA Systems, Inc., San Jose, CA (US)

( * ) Notice: Subject to any disclaimer, the term of this patent is extended or adjusted under 35 U.S.C. 154(b) by 360 days.

(21) Appl. No.: 10/348,515

(22) Filed: Jan. 21, 2003

(65) Prior Publication Data

US 2004/0143645 A1    Jul. 22, 2004

(51) Int. Cl.
*G06F 13/00* (2006.01)
(52) U.S. Cl. ...................................... 709/203
(58) Field of Classification Search ................ 709/200, 709/201, 219, 203, 217, 218; 719/330; 718/100, 718/102

See application file for complete search history.

(56) References Cited

U.S. PATENT DOCUMENTS 6,728,960 B1 *  4/2004  Loomans ................... 718/102

OTHER PUBLICATIONS

Andrew S. TanenBaum, "Structured Computer Organation Second Edition", pp. 11-12 (1984).*
Jerry M. Rosenberg, Ph.D "Dictionary of Computers, Information Processing, and Telecommunications 2ND Edition", p. 31 (1987).*
Bea Systems, Inc., "Invoking WebLogic Web Services", http://e-docs.bea.com/wls/docs61/webServices/client.html, pp. 1-18 (2001).*

* cited by examiner

*Primary Examiner*—Robert B. Harrell
(74) *Attorney, Agent, or Firm*—Fliesler Meyer LLP

(57) ABSTRACT

A system and method for asynchronously invoking a remote web service on a server by application code residing on a client. The web service invoke request received from application code residing on the client, passes an invoke request to a web service residing on a server, receives a result from the web service, the result relating to the invoke request passed by the client, and transmits the result to the application code. Once the invoke request is passed to the web service by the client, the application code is freed to perform other tasks. The result may be transmitted to the application code from the client as part of a call back object passed to the client by the application code, as a result of application code polling of the client, or by the application code ending the task generated by the client.

26 Claims, 5 Drawing Sheets

ASYNCHRONOUS INVOKING A REMOTE WEB SERVICE ON A SERVER BY A CLIENT WHO PASSES ON A RECEIVED INVOKE REQUEST FROM APPLICATION CODE RESIDING ON THE CLIENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to remote web services, and more particularly to asynchronously invoking a remote web service.

BACKGROUND OF THE INVENTION

Java standards for web services are constantly being developed. Concurrently, businesses are building important applications on top of web services infrastructures, such as that available in WebLogic Server from BEA Systems of San Jose, Calif. As these applications evolve, they become more complex with more operations to perform.

A system illustrating a client-server system is illustrated in FIG. 1. A typical web service 135 residing on a server 130 may be accessed by a client 120. The client may be implemented as a stand alone machine that communicates with the server over a physical connection or a logically implemented client that resides on the same machine as the server. If implemented on a stand alone machine, the client includes a processor 121, RAM 122, input device 123 and output device 124. In either embodiment, the client is configured to include vendor-added application code 125 as well as standard JAVA objects such as client web service applications 126 such as client web service Runtime. The server 130 includes a web service 135. A user may invoke the web service 135 through the client 120.

FIG. 2 illustrates a method 200 for invoking a web service. Operation of method 200 begins with start step 205. Application code requests a web service at step 210. In one embodiment, application code residing within the client initiates a call to the client's runtime routine to request a web service residing on a server. This may be initiated by a user or other code within the client. Next, the client invokes the web service on the server in step 220. The invocation request initiates the generation of an application thread by runtime in which the request is carried out. The server receives the request and processes the request at step 230. Next, the server returns a result to the client at step 240. The client receives the result in step 250 and provides the application code with the result at step 260. The thread is then complete and operation of method 200 then ends at step 265. Throughout steps 220–260, the synchronized operation initiated by the application code is performed within a single thread. Thus, the synchronized operation involves the application code waiting for a response from the client before performing other tasks. Thus, the thread is blocked until the web service invoke is complete. An Enterprise Java Bean (EJB) does not allow application code to create new threads. As a result, the method currently used by client server systems to process user requests is slow and inefficient.

What is needed is a web service invocation model that allows a user to perform other tasks while a request is being processed.

SUMMARY OF THE INVENTION

The present invention provides asynchronous remote web service invocation. A system in accordance with one embodiment of the present invention includes a client and a remote server. Invocation of a web service on the server by the client is initiated from an application thread. This application thread is then freed by the client web service runtime to allow the application to process other tasks while the web service is invoked. In one embodiment, asynchronous web service invocation for a system in Java is implemented by freeing the thread used by the application to invoke the web service. Once the first thread is free, the application code may perform other tasks while the second thread carries out the web service invocation. Results from the invoked remote web service are transmitted to the client.

DETAILED DESCRIPTION

The present invention provides asynchronous remote web service invocation. A system in accordance with one embodiment of the present invention includes a client and a remote server. Invocation of a web service on the server by the client initiates an application thread. The application initiated thread is used to access the web service. The user generated thread is then freed to allow the application to process other tasks while the web service is invoked. In one embodiment, asynchronous web service invocation for a system in Java is implemented by freeing the thread initiated by the application to invoke the web service. In one embodiment, the client web service run time frees the first thread and uses a second thread to carry out the web service invocation. Once the first thread is free, the application code may perform other tasks while the second thread carries out the web service invocation. Results from the invoked remote web service are transmitted to the client.

Figure 1:
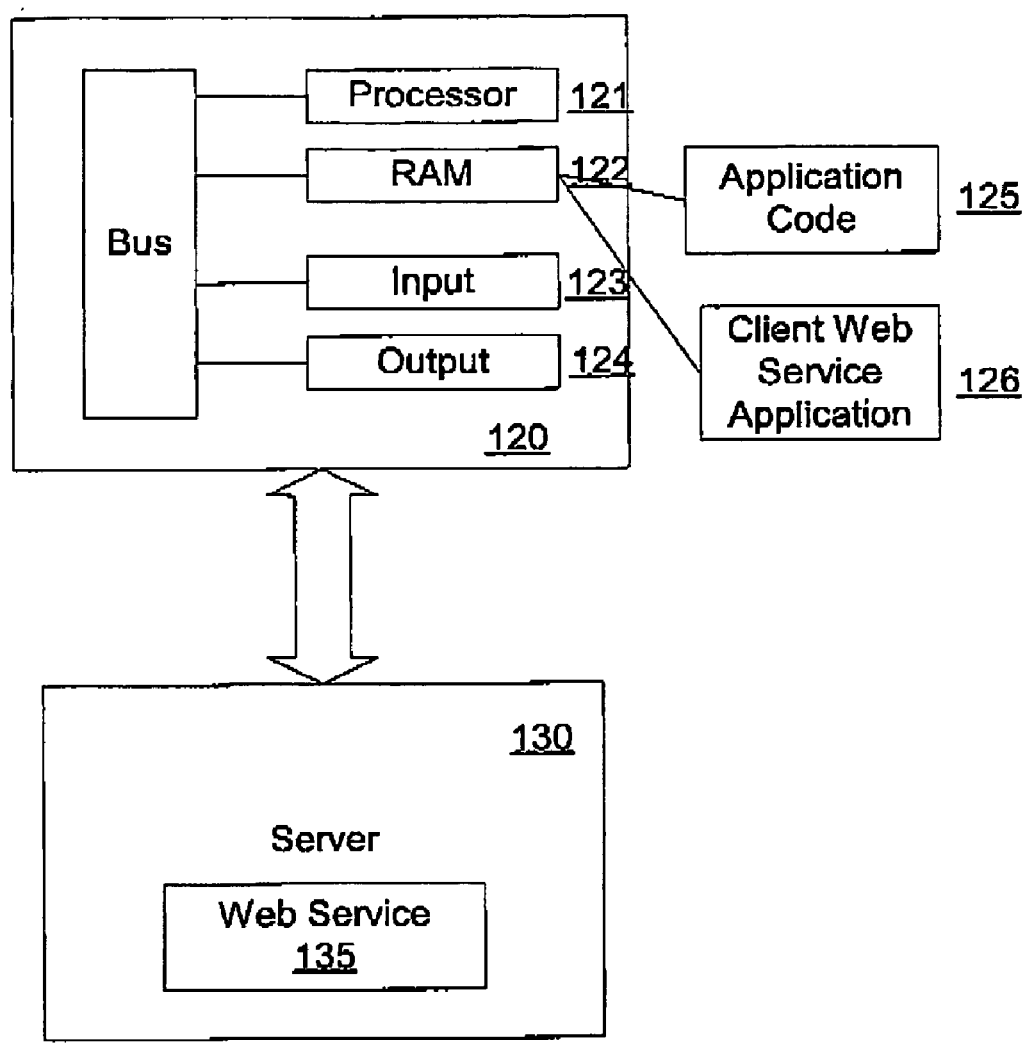
FIG. 1 is an illustration of a system for providing access to a remote web service by a user in accordance with one embodiment of the present invention.
Figure 2:
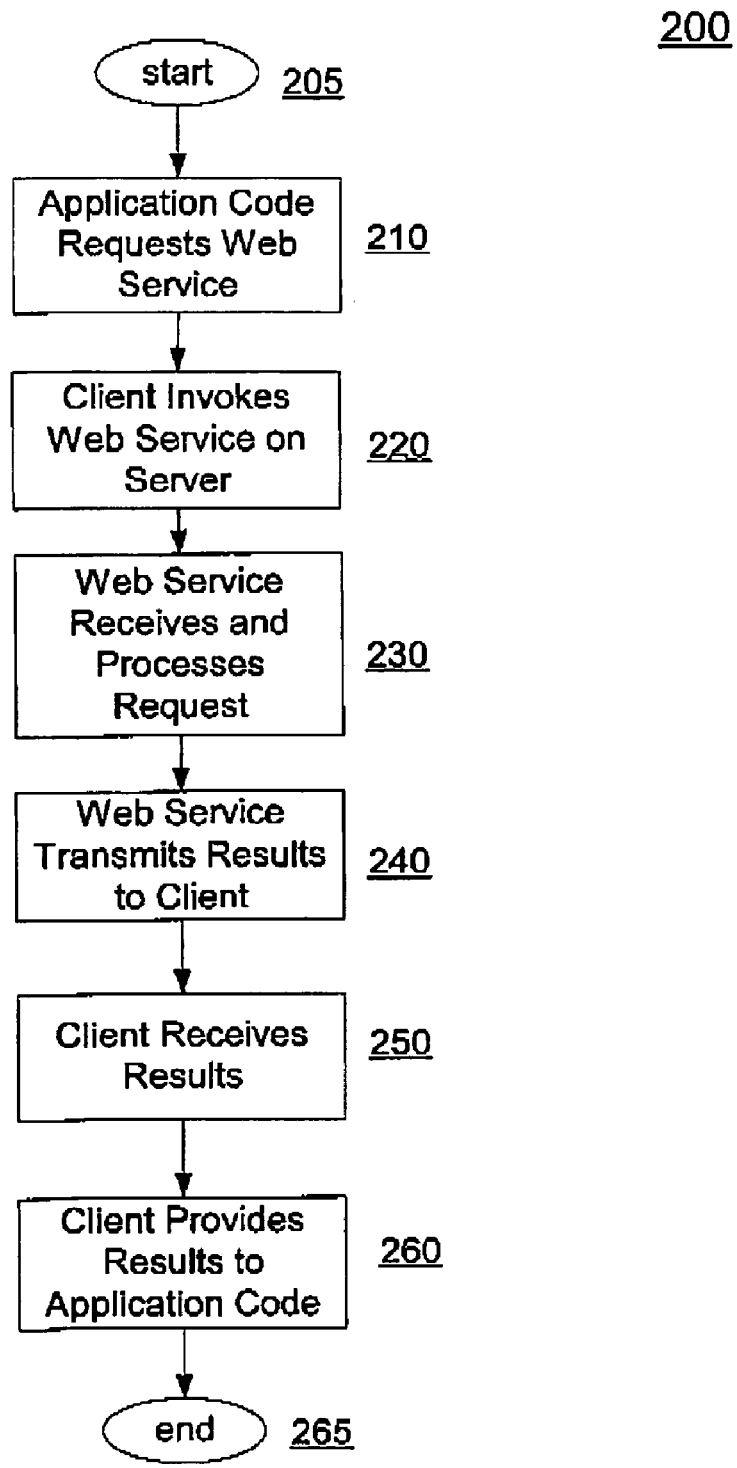
FIG. 2 is an illustration of a prior art method for providing synchronous invocation of a remote web service.
Figure 3:
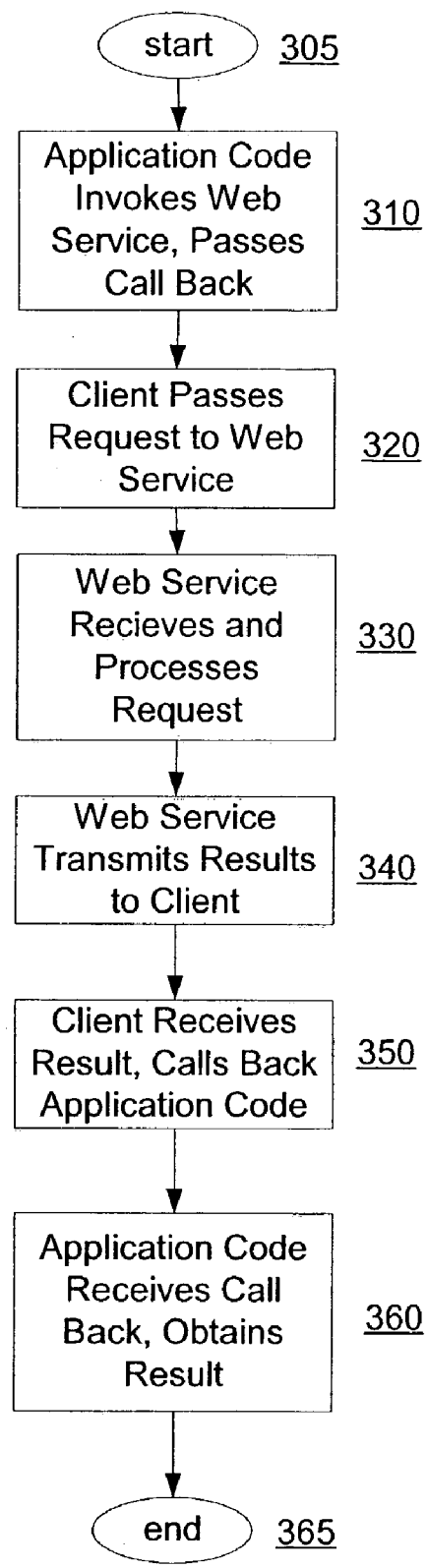
FIG. 3 is an illustration of a method for providing asynchronous invocation of a remote web service using a callback technique in accordance with one embodiment of the present invention.

A method 300 for providing asynchronous invocation of a remote web service using a call back technique in accordance with one embodiment of the present invention is illustrated in FIG. 3. Operation of method 300 begins with start step 305. Application code invokes a web service and passes a call back parameter to the client in step 310. During the invocation of the web service by the application code, the client web service Runtime Routine generates a first thread to carry out the invocation. The application code may be located on a stand alone client machine or implemented logically as discussed above in reference to FIG. 1. In one embodiment, the application code creates an asynchronous context and passes a call back object to the client as part of asynchronous context creation. The asynchronous context may contain information. A start method call made subsequently by the client may include the asynchronous context (AC) and arguments.

In step 320, the client passes a request to the web service. In one embodiment, passing a request to the webservice includes invoking an operation to access the remote web service by generating a second thread while the first application thread is freed. Freeing the first application thread allows the user to process other tasks instead of waiting to receive the result from the web service invocation. In one embodiment, a call is made to the asynInvoke method on the client stub. The operation then sends a message to a client dispatcher located on the client. The client dispatcher then creates a FutureResult object, the object to be sent back to the user, creates a task, and schedules this task to the thread pool. The created task includes sending a request to the web service and receiving a result from the web service. Scheduling a task to the thread pool allows a second thread to handle execution of the task. The task is then executed by calling a method of the web service. The second thread processes the call that invokes the task. The task uses a protocol binding to transmit the task request data over a network to a web service for processing.

The Web service located on the server receives and processes the request at step 330. Processing the request includes invoking the requested web service and obtaining a result. The server will use the parameters passed by the client, if any, to obtain a result from the web service. Once the remote method of the web service has been invoked and a result is generated, the result is transmitted by the web service back to the client at step 340. In one embodiment, the result is received by the protocol binding. The task then sets the future result value to the value of the result received from the web service.

The client receives the result and invokes a call back to the application code at step 350. In one embodiment, the call back indicates the result is available at the client for the application code to access. In one embodiment, this includes the web service client runtime initiating the context to notify any listening entities.

The application code receives the call back and obtains the result from the client at step 360. In one embodiment, the application code accesses the web service client runtime and retrieves stored FutureResult value. In yet another embodiment, the client invokes the client stub. The client stub then retrieves the future result from the client and provides the application code with the result. Operation of method 300 then ends at step 355.

An example of application code that may be used to implement the method of FIG. 3 along with client code (not shown) is shown below.

```
public class Main{
    public void test ( ) throws Exception{
        SimpleTest echoService = new SimpleTest_Impl ( );
        SimpleTestSoap echoPort = echoService.getSimpleTestSoap ( );
```

-continued

```
{/ /callback style
    WSContext wsContext = new WSContext ( );
    wsContext.setResultListener( new ResultListener ( ) {
        public void onCompletion ( InvokeCompletedEvent event ) {
            SimpleTestSoap source = (SimpleTestSoap)
            event.getSource (
        );
            try{
                String result = source.endEchoString(
            event.getFutureResult ( ) );
                    weblogic.utils.Debug.say ( Acallback result: @ +
            result );
                    gotCallback = true;
                }catch ( RemoteException e ) {
                    e.printStackTrace ( System.out );
                }
            }
    });
        echoPort.startEchoString ( A94501", wsContext );
}
```

Figure 4:
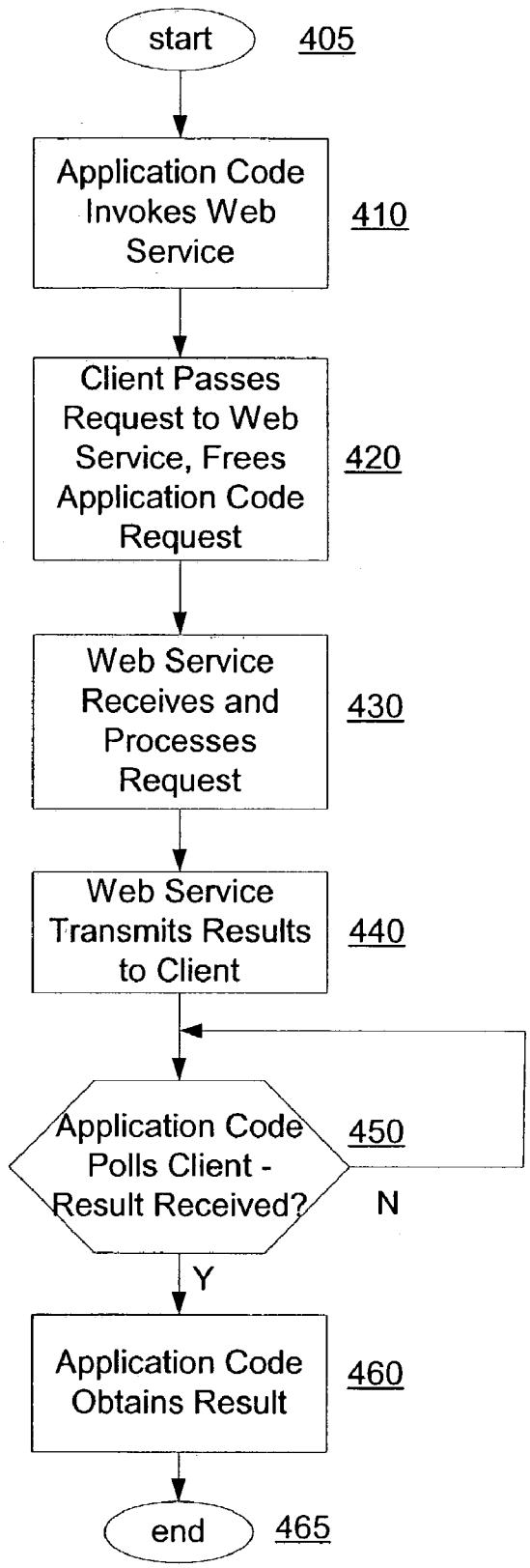
FIG. 4 is an illustration of a method for providing asynchronous invocation of a remote web service using a polling technique in accordance with one embodiment of the present invention.

In another embodiment of the present invention, a polling technique may be used to asynchronously invoke a remote web service. A method 400 for providing asynchronous invocation of a remote web service using a polling technique in accordance with one embodiment of the present invention is illustrated in FIG. 4. Operation of method 400 begins with start step 405. Application code invokes a web service in step 410. In one embodiment, application code invokes a call to remote method of a remote web service in step 410. In contrast to the call back technique of method 300 in FIG. 3, no call back is passed with the remote method call. As in method 300, the web service client runtime generates a thread upon the invocation request by the application code. The web service invocation may be initiated by a user action at a console, on a graphical user interface, or by application code. The application code may be located on a remote or logically implemented client. In one embodiment, the application code creates an async context and calls a start method. The start method call may include the asynchronous context (AC) and arguments.

Next, the client calls a remote method of the web service and passes the request to the web service in step 420. In this embodiment, the client invokes an operation using a second thread while freeing the first thread associated with the application code. Freeing the first thread allows the user to process other tasks instead of waiting to receive the result from the web service invocation. In one embodiment, calling a remote method includes calling an asynInvoke operation on the client stub. The operation then sends a message to a client dispatcher located on the client. The client dispatcher then creates a FutureResult object, the value to be sent back to the user, creates a task, and schedules this task to the thread pool. The created task includes sending a request to the web service and receiving the result of the remote method from the web service. Scheduling a task to the thread pool allows a second thread to handle execution of the task. The task is then executed using an execute call. The second thread processes the execute command that invokes the task. The task uses a protocol binding to send the result back to the client. The binding issued to transmit the task over a network to a web service for processing.

The server receives and processes the request to obtain a result at step 430. After the server obtains a result, the server sends the result to the client, as shown in step 440. In one embodiment, the result is received by the client binding. The task then sets a future result object with the value received from the web service. The application code then polls the client Runtime to determine if the client has received a result from the server in step 450. If the client indicates it has not received a result from the server, operation loops back to step 450 where the application code continues to poll the client. In one embodiment, the user will poll the client at some interval of time after the previous poll. If the client indicates it has received a result from the server, operation continues to step 460. In step 460, the user obtains the result from the client runtime. Operation of method 400 then ends at step 465. In another embodiment, the poll of step 460 occurs at some other point during operation of method 400 than after step 450. For example, the polling step may occur immediately after the client passes the request to the web service.

An example of application code that may be used to implement the method of FIG. 4 is shown below.

```
public class Main{
    public void test ( ) throws Exception{
        SimpleTest echoService = new SimpleTest_Impl ( );
        SimpleTestSoap echoPort = echoService.getSimpleTestSoap ( );
{ / /async poll style
        FutureResult futureResult = echoPort.startEchoString( A94501",
        null );
        while ( !futureResult.isCompleted ( ) ) {
            weblogic.utils.Debug.say ( Aasync polling ...@ );
            // other tasks performed by the application code here. . .
        }
        String result = echoPort.endEchoString ( futureResult );
        weblogic.utils.Debug.say ( Apoll result: @ + result );
}
```

Figure 5:
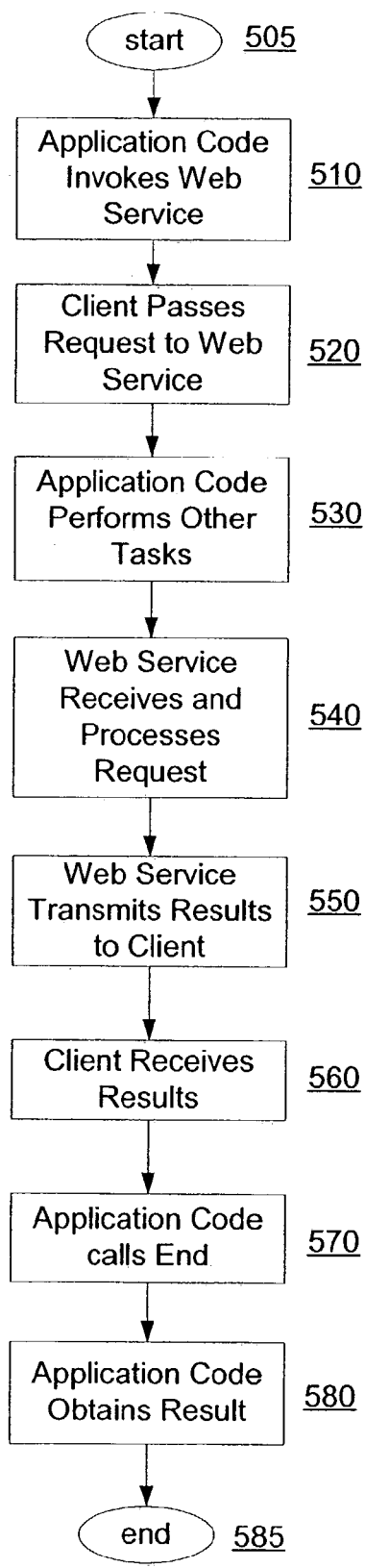
FIG. 5 is an illustration of a method for providing asynchronous invocation of a remote web service using a delayed end call technique in accordance with one embodiment of the present invention.

In another embodiment of the present invention, a delayed end call technique may be used to asynchronously invoke a remote web service. In this embodiment, an end method may be called to obtain the result from an asynchronous invocation. A method 500 for providing asynchronous invocation of a remote web service using a static end technique in accordance with one embodiment of the present invention is illustrated in FIG. 5. Operation of method 500 begins with start step 505. Application code invokes a remote web service in step 510. As in methods 300 and 400, the invocation request by the application code generates a first thread to process the request. The web service invocation may be initiated by a user action at a console, on a graphical user interface, or by application code. The application code may be located on the client computer or on some other system or machine. In one embodiment, the application code creates an asynchronous context and calls a start method. The start method call may include the asynchronous context (AC) and arguments.

Next, the client passes the request to the web service in step 520. In one embodiment, the client invokes an operation to access the remote web service in step 520. In this embodiment, the client invokes an operation using a second thread and passes arguments needed to invoke the web service. The arguments may have been generated from the application code or the client itself. Invoking an operation may include the client stub calling an asynInvoke operation. The operation then sends a message to a client dispatcher located on the client. The client dispatcher then creates a FutureResult value, the value to be sent back to the application code, creates a task, and schedules the task to the thread pool. The created task includes sending a request to the web service and receiving a result from the web service. Scheduling a task to the thread pool allows a second thread to handle execution of the task. The task is then executed using an execute command. The second thread processes the execute command that invokes the task. The task is then sent to the client binding. The binding sends the task over a network to a web service for processing.

After the client passes the request to the web service in step 520, the application code may perform other tasks at step 530. These other tasks will include tasks performed by the application code that do not require a result from the invoked web service. Though listed as step 530 in method 500 of FIG. 5, the other tasks may be performed at any time after the start call is made in step 510 and the end call is made in step 570.

After the application code has made a start call, the web service located on the server receives and processes the request in step 540. Processing the request includes generating a result from the web service. The web service then transmits the result to the client in step 550. The client receives the result in step 560. In one embodiment, the result is received by the binding. The task created earlier then sets FutureResult to the value of the result received from the web service.

At some point before the application code requires the result, the application code will invoke End() to end the first thread, as shown in step 570. The end call serves to end the first thread. In step 580, the application code obtains the FutureResult from the client. Operation of method 500 then ends at step 585. An example of user code that may be used to implement the method of FIG. 5 is shown below.

```
public void test ( ) throws Exception{
    SimpleTest echoService = new SimpleTest_Impl ( );
    SimpleTestSoap echoPort = echoService.getSimpleTestSoap ( );
{/ / sync invoke using async style
    FutureResult futureResult = echoPort.startEchoString ( A94501",
    null )=
        // other tasks performed by the application code here. . .
    String result = echoPort.endEchoString ( futureResult );
    weblogic.utils.Debug.say ( Async result:@ + result );
}
```

In one embodiment of the invention, the systems illustrated in FIGS. 3, 4 and 5 may be a request-response service. In a request-response service, the client sends a request to a server and receives a response from the server over the same socket connection. In another embodiment of the present invention, a server may send the result back to the client on a second socket connection that differs from the line the request was received on by the server. In this embodiment, the thread driving the request is free when the client sends the request to the server. Once the request is processed and a result is obtained by the server, the server uses a new thread to drive the transmittal of the result back to the client. Since the first thread is freed when the client sends the request, the user is free to process other tasks. The user is not restricted from doing other tasks while waiting to receive the result from the web service. The systems illustrated in FIGS. 3, 4 and 5 may be used to implement a system with a server having two one-way transmissions.

In one embodiment of the present invention, asynchronous web service invocation is enabled when an attribute generateAsyncMethods in clientgen task is set to true. This will generate a client stub with asynchronous web invocation methods that start and stop the asynchronized invocation.

The present invention provides asynchronous remote web service invocation. A system in accordance with one embodiment of the present invention includes a client and a remote server. Invocation of a web service on the server by the client initiates an application thread. The application initiated thread to access the web service. The user generated thread is then freed to allow the application to process other tasks while the web service is invoked. In one embodiment, asynchronous web service invocation for a system in Java is implemented by freeing the thread initiated by the application to invoke the web service. In one embodiment, the client web service run time frees the first thread and uses a second thread to carry out the web service invocation. Once the first thread is free, the application code may perform other tasks while the second thread carries out the web service invocation. Results from the invoked remote web service are transmitted to the client.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing at least one of additive model representation and reconstruction.

Included in the programming (software) of the general/specialized computer or microprocessor are software modules for implementing the teachings of the present invention.

The invention claimed is:

1. A method for asynchronously invoking a remote web service on a server by a client, the method comprising:
   generating a first thread by an application code residing on the client, the first thread adapted to initiate a web service invoke request to the client;
   receiving the web service invoke request by the client, the web service invoke request received from an application code residing on the client;
   creating a future result value by a client dispatcher residing on the client and sending the future result value to the application code;
   scheduling a task by the client dispatcher to a thread pool, the task including sending the invoke request to the web service residing on the server and receiving a result from the web service;
   assigning a second thread from tde thread pool by the client, the second thread adapted to execute the task by passing an invoke request by the client to a web service residing on a server;
   freeing the first thread by the client such that the application code is enabled to perform additional tasks unrelated to the web service invoke request, once the first thread is freed;
   receiving a result by the client from the web service, the result relating to the invoke request passed by the client;
   notifying the application code that the result is available;
   receiving a result request from the application code by the client; and
   transmitting the result to the application code.

2. The method of claim 1 wherein said receiving a web service invoke request includes:
   receiving a call back object by the client from the application code, wherein notifying the application code includes returning the call back object to the application code from the client.

3. The method of claim 2 wherein the call back object is contained in an asynchronous context.

4. The method of claim 3 wherein passing an invoke request by the client to a web service residing on a server includes:
   passing the asynchronous context to the web service from the client.

5. The method of claim 1 wherein the task sets the future result value to the value of the result received from the web service.

6. A system for asynchronously invoking a remote web service on a server by a client, comprising:
   an application code residing on the client that generates a first thread to initiate a web service invocation request to the client wherein the client receives the invocation request;
   a client dispatcher residing on the client that creates a future result value to be sent back to the application code and creates a task for carrying out execution of the web service invocation request, the task scheduled to a thread pool and a second thread assigned to execute the task;

a web service residing an the server that receives the invocation request from the client and executes the invocation request and returns a result to the client;

wherein the first thread is freed up by the second thread assigned to execute the task such that the application code is enabled to perform tasks unrelated to the invocation request; and wherein the application code is notified by the client that a result is available and upon notification, requests the result and wherein the client transmits the result to the application code after receiving the result request.

7. The system of claim 6 wherein the client receiving the invoke request also receives a call back object from the application code and wherein the application code is notified by returning the call back object to the application code.

8. The system of claim 7 wherein the call back object is contained in an asynchronous context.

9. The system of claim 8 wherein the client passes the asynchronous context to the web service along with the invoke request.

10. The system of claim 6 wherein the task is sent to the client binding and wherein the client binding sends the task over a network to a web service for processing.

11. The system of claim 10 wherein the result sent back from the web service is received by the binding.

12. The system of claim 6 wherein by freeing the first thread, the application code is enabled to perform any task that does not require a result from the invoked web service.

13. The system of claim 6 wherein the task sets the future result value to the value of the result received from the web service.

14. A method for asynchronously invoking a remote web service on a server by a client, the method comprising:

generating a first thread by an application code residing on the client, the first thread adapted to initiate a web service invoke request to the client;

creating a future result value by a client dispatcher residing on the client and sending the future result value to the application code;

scheduling a task by the client dispatcher to a thread pool, the task adapted to send the invoke request to the web service residing on the server and receiving a result from the web service;

assigning a second thread from the thread pool by the client the second thread adapted to execute the task by passing an invoke request by the client to the web service residing on the server;

freeing the first thread by the client such that the application code is enabled to perform additional unrelated tasks once the first thread is freed;

receiving a result by the client from the web service, the result relating to the invoke request passed by the client;

receiving a poll from the application code;

notifying the application code that the result is available;

receiving a result request from the application code by the client; and transmitting the result to the application code.

15. The method of claim 14 wherein the task sets the future result value to the value of the result received from the web service.

16. The method of claim 14 wherein notifying the application code that the result is available further includes:

receiving a result ready signal from the client by the application code, the result ready signal received in response to the application code polling and indicating the result is ready.

17. A system for asynchronously invoking a remote web service on a server by a client, comprising:

an application code residing on the client that generates a first thread to initiate a web service invocation request to the client wherein the client receives the invocation request;

a client dispatcher residing on the client that creates a future result value to be sent back to the application code and creates a task carrying out execution of the web service invocation request, the task scheduled to a thread pool and a second thread assigned to execute the task;

a web service residing on the server that receives the invocation request from the client and executes the invocation request and returns a result to the client;

wherein the first thread is freed up by the second thread assigned to execute the task such that the application code is enabled to perform tasks unrelated to the invocation request; and wherein the client receives a poll from the application code and notifies the application code that a result is available in response to the poll and wherein the application code then requests the result from the client and the client transmits the result to the application code as a response to the request.

18. The system of claim 17 wherein the application receives a result ready signal from the client, the result ready signal received in response to the application code polling.

19. The system of claim 17 wherein the task sets the future result value to the value of the result received from the web service.

20. A method for asynchronously invoking a remote web service on a server by a client, the method comprising:

receiving in a first execution thread a web service invoke request by the client;

sending a message to the client dispatcher located on the client;

creating a task by the client dispatcher and assigning the task to a thread pool, the task configured to send the web service invoke request to the server and receive a result from the server;

assigning a second execution thread to execute the task by passing an invoke request by the client to the web service residing on the server;

freeing the first execution thread by the client; and receiving in the second execution thread a result by the client from the web service, the result relating to the invoke request passed by the client.

21. The method of claim 20, wherein the web service invoke request is received from an application, and wherein freeing the first execution thread by the client enables the application to continue processing.

22. A computer-readable storage medium carrying one or more sequences of instructions for asynchronously invoking a remote web service on a server, which instructions, when executed by one or more processors, cause the one or more processors to carry out the steps of:

receiving in a first execution thread a web service invoke request by the client;

sending a message to the client dispatcher located on the client;

creating a task by the client dispatcher and assigning the task to a thread pool, the task configured to send the web service invoke request to the server and receive a result from the server assigning a second execution thread to execute the task by passing an invoke request by the client to the web service residing on the server;

freeing the first execution thread by the client; and receiving in the second execution thread a result by the client from the web service, the result relating to the invoke request passed by the client.

23. The computer-readable storage medium of claim 22, wherein the instructions far carrying out the step of receiving in a first execution thread a web service invoke request by a client further comprise instructions for carrying out the steps of receiving in a first execution thread a web service invoke request from an application, and wherein the instructions for carrying out the step of freeing the first execution thread by the client enables the application to continue processing.

24. A method for asynchronously invoking a remote web service on a server by application code, the method comprising:

sending a web service invoke request by application code to a client, the client configured to pass the invoke request from the client to a remote web service, said sending a web service invoke request including generating a first thread;

scheduling a task to a thread pool by the client dispatcher, the task adapted to send the invoke request to the web service from the client;

assigning a second thread for performing a task by the client wherein the client is configured to free the first thread when passing on the web service invoke request to the remote web service;

polling the client by the application code to determine if a result has been received by the client from the web service, the result provided by the web service in response to the web service invocation; and obtaining the result from the client by the application code.

25. A method for asynchronously invoking a remote web service on a server by a client, the method comprising:

generating a first thread by an application code residing on the client, the first thread adapted to initiate a web service invoke request to the client;

receiving a web service invoke request by a client, the web service invoke request received from application code residing on the client, the application code executing a single thread;

creating a future result value by a client dispatcher residing on the client and sending the future result value to the application code;

scheduling a task by the client dispatcher to a thread pool, the task adapted to send the invoke request to the web service residing on the server and receiving a result from the web service;

assigning a second thread from the thread pool by the client, the second thread adapted to execute the task by passing the invoke request by the client to a web service residing on the server;

freeing the first thread by the client, wherein the application code is configured to perform additional unrelated tasks once the first thread is freed;

receiving a result by the client from the web service, the result relating to the invoke request passed by the client;

receiving an end call from the application code; and transmitting the result to the application code.

26. A system for asynchronously invoking a remote web service on a server by a client, comprising:

an application code residing on the client that generates a first thread to initiate a web service invocation request to the client wherein the client receives the invocation request;

a client dispatcher residing on the client that creates a future result value to be sent back to the application code and creates a task for carrying out execution of the web service invocation request, the task scheduled to a thread pool and a second thread assigned to execute the task;

a web service residing on the server that receives the invocation request from the client and executes the invocation request and returns a result to the client;

wherein the first thread is freed up by the second thread assigned to execute the task such that the application code is enabled to perform tasks unrelated to the invocation request; and wherein the client receives an end call from the application code and transmits the result to the application code.

* * * * *

UNITED STATES PATENT AND TRADEMARK OFFICE
CERTIFICATE OF CORRECTION

PATENT NO. : 7,206,807 B2  Page 1 of 1
APPLICATION NO. : 10/348515
DATED : April 17, 2007
INVENTOR(S) : Manoj Cheenath It is certified that error appears in the above-identified patent and that said Letters Patent is hereby corrected as shown below:

In column 8, line 25, please replace "tde" with --the--

In column 9, line 1, please respect "an" with --on--

Signed and Sealed this

Fifth Day of June, 2007

JON W. DUDAS
*Director of the United States Patent and Trademark Office*